(12) United States Patent
Boucher (10) Patent No.: US 11,433,410 B2
(45) Date of Patent: *Sep. 6, 2022

(54) SPRAY SYSTEM WITH DYNAMICALLY CONFIGURABLE DROPLET SIZES

(71) Applicant: BOULIND, INC., Tacoma, WA (US)

(72) Inventor: Peter Boucher, Tacoma, WA (US)

(73) Assignee: BOULIND, INC., Tacoma, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/859,744

(22) Filed: Apr. 27, 2020

(65) Prior Publication Data

US 2020/0254470 A1    Aug. 13, 2020

Related U.S. Application Data

(63) Continuation of application No. 15/461,277, filed on Mar. 16, 2017, now Pat. No. 10,668,493.

(51) Int. Cl.
| | |
|---|---|
| *A01G 7/06* | (2006.01) |
| *B05B 12/12* | (2006.01) |
| *A01C 23/04* | (2006.01) |
| *A01M 7/00* | (2006.01) |
| *B05B 7/24* | (2006.01) |
| *A01G 31/02* | (2006.01) |
| *B05B 17/06* | (2006.01) |

(52) U.S. Cl.
CPC ............ *B05B 12/12* (2013.01); *A01C 23/047* (2013.01); *A01G 7/06* (2013.01); *A01M 7/0089* (2013.01); *A01G 31/02* (2013.01); *B05B 7/2489* (2013.01); *B05B 17/06* (2013.01)

(58) Field of Classification Search
CPC ............... A01G 2/00; A01G 7/00; A01G 7/06
USPC .................................... 47/48.5, 57.7
See application file for complete search history.

(56) References Cited

U.S. PATENT DOCUMENTS

| | | | | |
|---|---|---|---|---|
| 4,261,511 A | * | 4/1981 | Erb | ........................ B05B 7/0416 |
| | | | | 239/8 |
| 5,136,804 A | | 8/1992 | Rothem | |
| 5,269,461 A | | 12/1993 | Davis | |
| 5,516,043 A | * | 5/1996 | Manna | ................ B05B 17/0623 |
| | | | | 239/102.2 |
| 5,946,853 A | | 9/1999 | Jacobs | |
| 5,956,897 A | | 9/1999 | Takashima | |
| 6,725,598 B2 | | 4/2004 | Yoneda | |
| 7,565,768 B2 | | 7/2009 | Bula | |
| 7,987,632 B2 | | 8/2011 | May | |
| 8,028,470 B2 | * | 10/2011 | Anderson | ............ A01G 25/167 |
| | | | | 47/48.5 |

(Continued)

FOREIGN PATENT DOCUMENTS

CN 202680054 U 1/2013
WO 2018/170491 A1 9/2018

OTHER PUBLICATIONS

Figures 1A and IB Nozzle for Dust Suppression; dated prior to Mar. 16, 2016; photos and accompanying statement.

(Continued)

*Primary Examiner* — David J Parsley

(74) *Attorney, Agent, or Firm* — Schwabe, Williamson & Wyatt, PC

(57) ABSTRACT

Apparatuses and methods for a spray system with dynamically configurable droplet sizes are disclosed.

23 Claims, 5 Drawing Sheets

(56) References Cited

U.S. PATENT DOCUMENTS

| | | | | |
|---|---|---|---|---|
| 8,382,008 | B1* | 2/2013 | Ricciardi | B05B 17/0607 |
| | | | | 239/102.2 |
| 8,672,235 | B2* | 3/2014 | Sardo | B05B 1/3093 |
| | | | | 239/136 |
| 8,904,705 | B2 | 12/2014 | Downs, Sr. | |
| 9,032,664 | B2 | 5/2015 | Yusibov | |
| 10,668,493 | B2* | 6/2020 | Boucher | A01M 7/0089 |
| 2009/0223513 | A1 | 9/2009 | Papania | |
| 2009/0293357 | A1 | 12/2009 | Vickers | |
| 2011/0232177 | A1* | 9/2011 | Eastin | A01C 1/04 |
| | | | | 47/57.7 |
| 2015/0013769 | A1 | 1/2015 | Saunders | |
| 2015/0069145 | A1* | 3/2015 | Yen | B05B 17/0646 |
| | | | | 239/102.2 |

OTHER PUBLICATIONS

International Search Report from the International Searching Authority for PCT/US2018/023026 dated May 31, 2018; 4 pages.
Progressive Plant Growing Has Business Blooming; Environmental and Agriculture Resources, Spinoff (2006); pp. 64-67.
Using Agglomerative Dust Suppression for Dust Abatement in Crushing and Screen Plants; Glen B. Warrington; 22nd Annual Meeting of Aggregate Producers Assoc. of Ontario; Ottawa, Ontario; Mar. 2, 1979; White Paper; 16 pages.

* cited by examiner

Non-transitory computer-readable storage medium
502

Programming Instructions or bit streams 504
configured to cause a computer device, in response to execution of the programming instructions or bit streams, to practice one or more operations of the methods described in reference to Figures 1-4.

Figure 5

SPRAY SYSTEM WITH DYNAMICALLY CONFIGURABLE DROPLET SIZES

CROSS-REFERENCE TO RELATED APPLICATIONS

Figure 1:
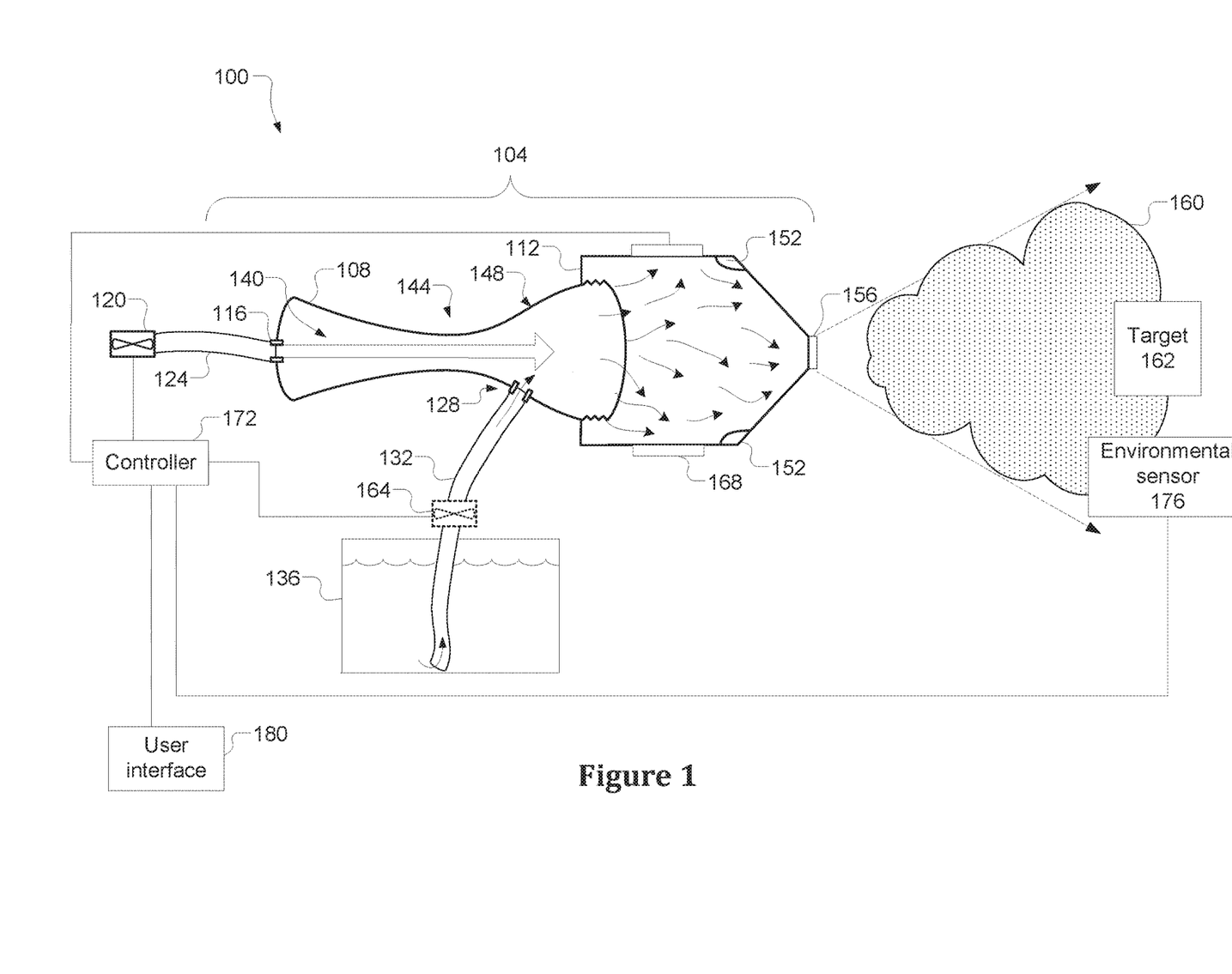

This application is a continuation of U.S. application Ser. No. 15/461,277, filed Mar. 16, 2017, the entire disclosure of which is incorporated herein by reference.

FIELD OF THE INVENTION

The present disclosure relates generally to the technical fields of spray systems, and more particularly, to a spray system with dynamically configurable droplet sizes.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Spray systems are used for a variety of applications in agricultural, industrial, and medical settings. Nozzles used in spray systems are used to control characteristics of a spray and are adapted to particular applications. Some nozzles produce a fine spray of liquid based on the Venturi effect that occurs when a fluid flows through a constricted section of a pipe.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 1 depicts a schematic diagram of an example spray system in accordance with some embodiments.

FIG. 2 illustrates a fertilizer delivery system in accordance with some embodiments.

FIG. 3 illustrates an example operation flow/algorithmic structure of the dynamic fertilizing operation in accordance with some embodiments.

FIG. 4 illustrates an example computer device suitable for use to practice aspects of the present disclosure, according to some embodiments.

FIG. 5 illustrates an example non-transitory, computer-readable storage media having instructions configured to practice all or selected ones of the operations associated with the processes described herein, according to some embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that "A or B" can mean (A), (B), or (A and B).

In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a schematic diagram of an example spray system 100 in accordance with some embodiments. The spray system 100 may include a nozzle 104 that includes a body 108 coupled with a head 112.

The nozzle 104 may include a first intake 116 to be coupled with a flow-control device, for example, compressed gas source 120, by a conduit 124, for example an air hose, tube, pipe, etc., that is to provide pressurized gas from the compressed gas source 120 to the nozzle 104.

In various embodiments, the compressed gas source 120 may include an air compressor or other pump-based system to provide pressurized gas through the conduit 124 to the nozzle 104. In many embodiments, the pressurized gas may be pressurized air; however, other specific gases or combinations of gases may be used in other embodiments.

The body 108 may further include a second intake 128 coupled with a conduit 132, which may be a hose, tube, pipe, etc., that is to provide fluid from a fluid reservoir 136, in which an open end of the conduit 132 is placed, to the nozzle 104.

In operation, the compressed gas source 120 may provide the pressurized gas to the body 108 through the first intake 116 causing an airflow 140 through the body 108. As the airflow 140 travels through a choke section 144, which is an area having a cross-sectional area that is less than cross-sectional areas of adjacent sections of the body 108, it may experience a Venturi effect. A velocity of the airflow 140 may increase (relative to velocity of the airflow 140 through the section that precedes the choke section 144) and the pressure may decrease in both the choke section 144 and an expansion section 148 that follows the choke section 144. As the airflow 140 goes through the expansion section 148, where the second intake 128 may be located, the low pressure may siphon fluid from the fluid reservoir 136 into the expansion section 148. The fluid from the fluid reservoir 136 may combine with the airflow 140 to provide a combined fluid flow.

In various embodiments, the fluid in the fluid reservoir 136 may be water or a water-based solution with solutes adapted to a particular application. Solutes delivered through the spray system 100 may include, but are not limited to, fertilizers, pharmaceuticals, pesticides, or any other type of biological or chemical solutes.

Figure 2:
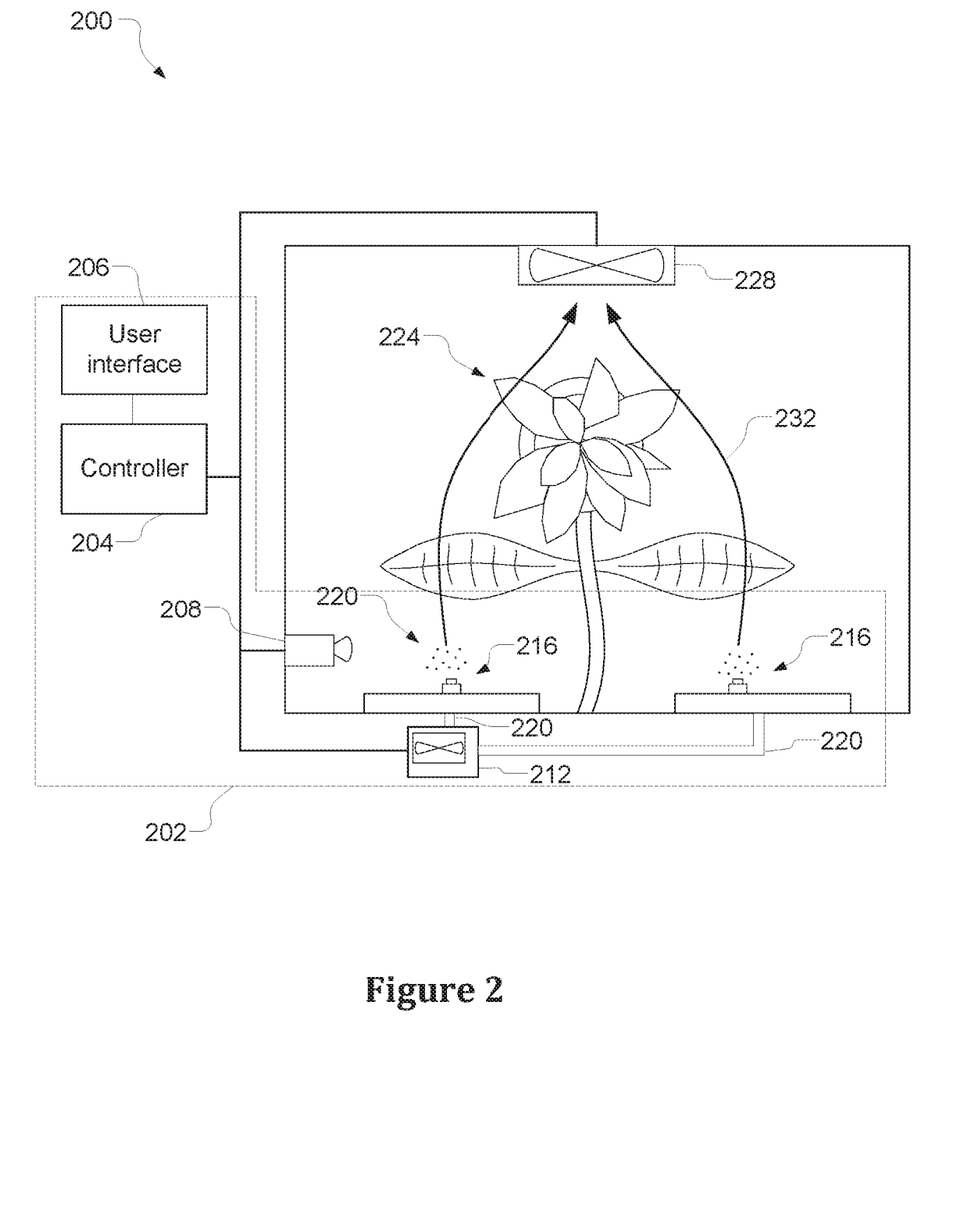

The combined fluid flow may exit the body 108 and enter a cavity of the head 112. The combined fluid flow moving through the cavity of the head 112 may cause the head 112 to vibrate. The vibration of the head 112 may cause an atomizing effect to break up the fluid droplets in the combined fluid flow into smaller and smaller sizes. The head 112 may also include one or more foils 152 disposed on an interior surface of the head 112. The foils 152 may be small protuberances that facilitate the atomizing effect to break up the fluid droplets into smaller and smaller sizes. The nozzle 104 may emit, from an output orifice 156, a fine spray 160, which may also be referred to as a fog 160, that encompasses a target 162.

The spray system 100 may be capable of producing a fog 160 with a wide range of droplet sizes. The desired droplet sizes may depend on a particular application. For example, some embodiments, including those described in further detail below, will benefit from very small droplet sizes, for example, 0.5 microns. The spray system 100 may be configured to produce a fog 160 with such droplet sizes.

The target 162 may be application dependent. For example, in some embodiments, the spray system 100 may be used to deliver fertilizer and the target 162 may be one or more plants. In another embodiment, the spray system 100 may be used for dust suppression and the target 162 may be airborne particles with the fog 160 being used to agglomerate the particles and remove them from the air; or the fog 160 may be applied to material piles to prevent the particles from becoming airborne. In yet another embodiment, the spray system 100 may be used in a medical application with the target 162 being a patient to be treated with the fog 160.

As will be described in further detail herein, a size of the droplets of the fog 160 may be based on, among other things, the pressure of the pressurized gas provided to the nozzle 104, the frequency at which the head 112 vibrates, and the configuration of the foils 152. The configuration of the foils 152 may include, for example, design, shape, size, number, and position within the head 112. While many of the factors that determine the size of the droplets are statically configured, others may be adjusted dynamically in order to effectuate a dynamic adjustment of the droplet sizes as will be described.

The vibration of the head 112 may depend on, for example, a pressure of the combined fluid flow, a nature of a coupling of the head 112 and the body 108, and a construction of the head 112 itself. For example, if the head 112 is constructed of a relatively thick metal, the head 112 may vibrate at a first frequency for a given pressure of the combined fluid flow and if the head 112 is constructed of a relatively thin metal, the head 112 may vibrate at a second frequency for the given pressure of the combined fluid flow.

The resonating frequency of the head 112 may be tuned from a first frequency to a second frequency in any of a number of ways. For example, in one embodiment the head 112 may be tuned from a first frequency to the second frequency by adjusting (for example, loosening or tightening) a coupling relationship between the head 112 and the body 108. For example, if the head 112 and the body 108 are coupled with one another using a threaded coupling mechanism, the head 112 may be tuned by screwing or unscrewing the head 112 from the body 108 a certain degree.

In some embodiments, the spray system 100 may include a mechanical actuator 168 coupled with the head 112 or body 108 (coupling solely with the head 112 is shown, but other arrangements may also be used). The actuator 168 may mechanically adjust a coupling relationship between the head 112 and the body 108. For example, in some embodiments, the actuator 168 may loosen or tighten the coupling relationship.

In some embodiments, the spray system 100 may include a flow-control device such as a pump 164 coupled with the conduit 132. The pump 164, which may be excluded in some embodiments, may be useful in embodiments in which the distance between the nozzle 104 and the fluid reservoir 136 is over a certain distance or if a larger concentration of fluid is desired for the resulting fog 160. However, relying solely on the siphoning action to introduce the fluid into the nozzle 104 may result in the fog 160 having smaller droplet sizes.

In some embodiments, the spray system 100 may also include a controller 172 that is coupled with the compressed gas source 120, the pump 164, and the actuator 168. The controller 172 may further be coupled with an environmental sensor 176 that may include one or more sensors to detect characteristics associated with the fog 160 or target 162. The controller 172 may further be coupled with a user interface 180. The user interface 180 may include a touchscreen display, a keyboard, or any other type of user interface that allows a user to provide control information to the controller 172.

In some embodiments, the controller may receive input signals from the user interface 180 or feedback signals from the environmental sensor 176 and determine a desired droplet size of the fog 160 based on the input/feedback signals. The controller 172 may then control components of the spray system 100 in a manner to provide the fog 160 with the desired droplet sizes. For example, the controller 172 may control a pressure of the air/fluid that is being introduced to the nozzle 104 by controlling compressed gas source 120 or the pump 164, or may control the coupling relationship of the body 108 and the head 112.

FIG. 2 illustrates a fertilizer delivery system 200 in accordance with some embodiments. The fertilizer delivery system 200 may include a spray system 202 that may be similar to spray system 100 with like-named components being substantially interchangeable unless otherwise described.

The spray system 202 may include a controller 204 coupled with an environmental sensor 208 and one or more flow-control devices 212. The controller 204 may also be coupled with a user interface 206 that may be used to provide a user access to the control functionality provided by the controller 204. In some embodiments, the user interface 206 may provide input signals that are used to program a fertilization schedule.

The flow-control devices 212, which may include a compressed gas source or a pump, may be coupled with a plurality of nozzles 216 by conduits 220. The controller 204 may control the flow-control devices 212 to provide air/liquid flow to the nozzles 216 in a manner to provide a fog 222 with desirable characteristics for a target, for example, plant 224. The desirable characteristics may be a particular density, volume, droplet size, etc. In some embodiments, the controller 204 may rely on feedback signals from the environmental sensor 208 or input signals from the user interface 206 to determine characteristics of the fog 222 or plant 224 in order to ensure the fog 222 has the desirable characteristics.

The fertilizer delivery system 200 may provide a foliar feeding technique by applying a liquid fertilizer directly to the leaves of the plant 224. The plant 224 may absorb the nutrients in the fertilizer through its stomata and epidermis. Plant cuticles covering the epidermis of the leaves may be a waxy, hydrophobic covering that acts as a permeability barrier for water and water-soluble materials. The size of the droplets of the fog 222 may determine what, if any, of the nutrients passes through this barrier and are absorbed through the stomata and epidermis. Having droplets that are too large may result in the liquid fertilizer beading up and running off of the plant due to the Lotus effect associated with an ultralyophobicity of the leaves of the plant 224. Furthermore, in some embodiments, large droplets may damage or otherwise inhibit growth of trichomes or root hairs (if, for example, the fertilizer delivery system 200 were used in a hydroponic system). If the droplets are too small, the fog 222 may have less nutrient-carrying capacity. For at least these reasons, it may be desirable to adjust a droplet size of the fog 222 based on the specific properties of the plant 224.

In some embodiments, the absorption properties of the plant 224 may be observed using the environmental sensor 208. In this manner, the fertilizer delivery system 200 may be calibrated for a particular species or type of plant throughout all stages of the growth of the plant 224.

Figure 3:
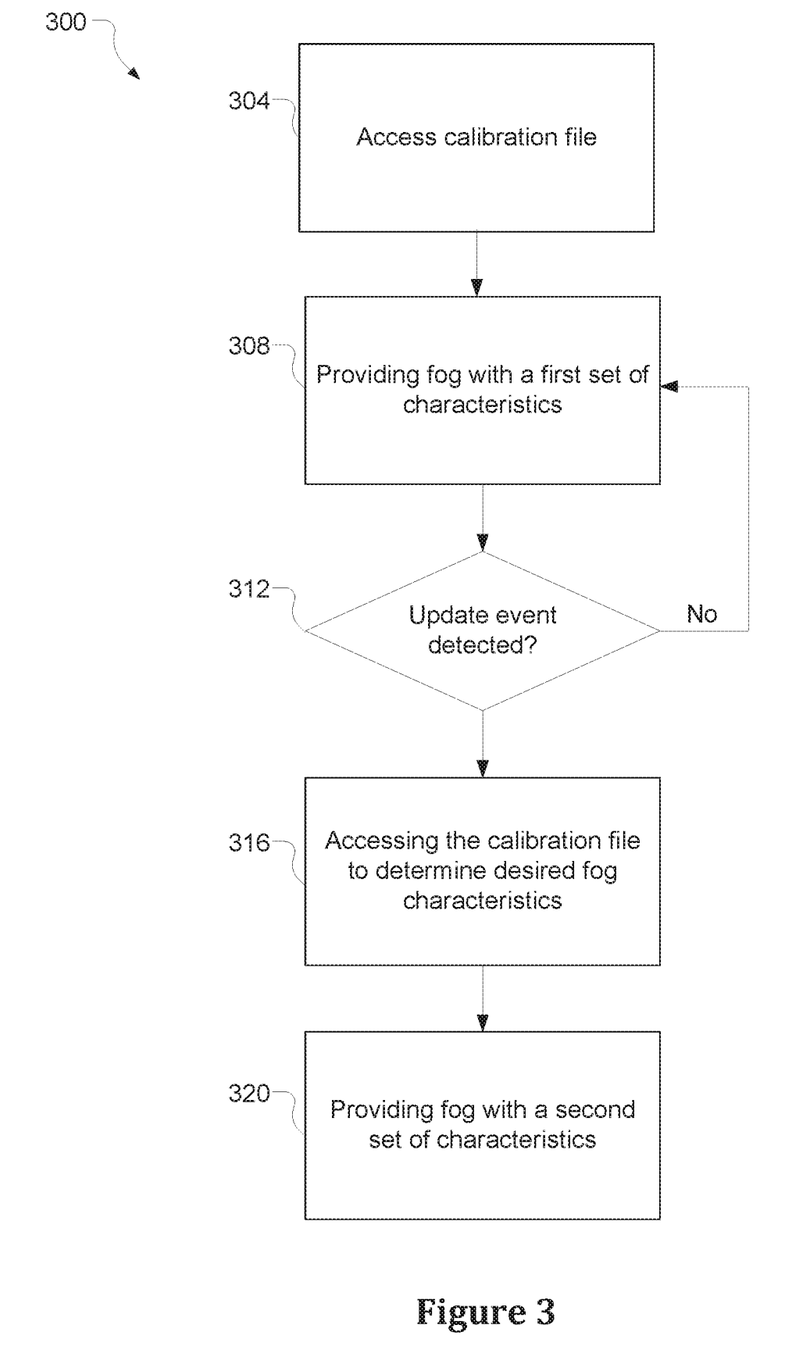

Calibration of the fertilizer delivery system 200 to a particular species, type, or growth stage of plant may be done by, for example, spraying a traceable solution on the plant 224 by the nozzles 216. The environmental sensor 208 may include an image-detection device that is capable of detecting how the plant 224 absorbs the traceable solution or how the traceable solution moves through the plant 224. For each stage of a plant's growth, the controller 204 may cycle through various characteristics of the fog 222 to determine the set of characteristics that provide the desired absorption rate. These characteristics may be saved in an accessible calibration file in a memory of the controller 204. The calibration file may be used by the controller 204, or other fertilizer delivery systems, so that the fertilizer delivery system 200 provides the fog 222 with characteristics specifically adapted to a type, species, or growth stage of the plant 224.

In some embodiments, the traceable solution may simply be the liquid fertilizer; however, in other embodiments, the traceable solution may include components in addition to, or as an alternative to, the liquid fertilizer to facilitate the imaging or detection of the traceable solution. For example, in some embodiments, the traceable solution may include a radioisotope to facilitate imaging of the traceable solution by the environmental sensor 208.

In various embodiments, to include capabilities to track a traceable solution through the plant 224, the environmental sensor 208 may include any of a variety of image-detection devices including, but not limited to, a positron emission tomography device, a magnetic resonance imaging device, an x-ray computed tomography device, a nuclear magnetic resonance spectroscopy device, a microscopic imaging device, etc.

The fertilizer delivery system 200 may, in some instances, only provide the environmental sensor 208 with capabilities to track a traceable solution through the plant 224 if the fertilizer delivery system 200 is used for a calibration operation. Other fertilizer delivery systems may rely on a calibration file and may use a less-sophisticated environmental sensor 208 or no sensor at all. In an embodiment in which the controller 204 is pre-programmed with a calibration file associated with a type or species of the plant 224, the environmental sensor 208 may simply include a camera or other image-detection device. The feedback from the camera or other image detection device may be used by the controller 204 to determine a growth stage of the plant 224. The controller 204 may access the calibration file, based on the growth stage, to determine the desired characteristics of the fog 222.

In some embodiments, the fertilizer delivery system 200 may further include a fan 228 coupled with the controller 204. The fan 228 may be operated to cause a relatively low pressure area above the plant 224, which may result in airflow 232. The airflow 232 may cause the fog 222 to coat an underside of leaves of the plant 224. This may be beneficial in some foliar spraying applications.

FIG. 3 illustrates an example operation flow/algorithmic structure 300 of a dynamic fertilizing operation in accordance with some embodiments. In some embodiments, the example operation flow/algorithmic structure 300 may be performed by a controller of a fertilizer delivery system such as controller 204.

The operation flow/algorithmic structure 300 may include, at 304, accessing a calibration file to determine a first set of characteristics of a fog to be provided to a plant. In some embodiments, the calibration file may be stored in memory that is accessible by the controller. In some embodiments, the calibration file may be downloaded into memory or otherwise input into memory under control of a user interface, for example, user interface 206. In this manner, the controller may be initially configured with the information relevant to a particular application.

The controller 204 may access the calibration file to determine the desired fog characteristics based on properties of the target, for example, plant 224. In some embodiments, the properties of the plant 224 may be determined from input signals received from a user interface, for example, user interface 206, or feedback signals received from an environmental sensor, for example, environmental sensor 208. The signals may indicate that a plant is of a particular type, species, or size.

The operation flow/algorithmic structure 300 may further include, at 308, providing a fog with a first set of characteristics. The first set of characteristics may include, for example, droplet sizes (or ranges of droplet sizes) or concentration.

The provision of a fog with a first set of characteristics may be performed by the controller 204 providing control signals to one or more flow-control devices, for example, flow-control devices 212, to provide a combined fluid flow to one or more nozzles, for example, nozzles 216, at a first rate. The controller 204 may additionally/alternatively provide control signals to an actuator 168 to provide the fog with the first set of characteristics.

It may be understood that provision of the fog at 308 may not be constant. For example, the fog may be provided at scheduled intervals for scheduled durations as indicated by an initial configuration provided in the calibration file.

The operation flow/algorithmic structure 300 may further include, at 312, detecting an update event. An update event may be a scheduled event indicated in the calibration file (for example, after three weeks, the fertilizer process should advance to the subsequent fertilizing stage), input signals from the user interface, or detection of a change in properties of the target. In various embodiments, the controller may detect a change in properties of the target based on feedback signals from an environmental sensor, for example, environmental sensor 208.

If, at 312, no update events are detected, the operation flow/algorithmic structure 300 may loop back to providing the fog with a first set of characteristics at 308.

If, at 312, an update event is detected, the operation flow/algorithmic structure 300 may further include, at 316, accessing the calibration file to determine desired fog characteristics. The desired fog characteristics may be based on updated properties of the target, which may be determined based on feedback signals, internal schedule, or input signal from the user interface. In this manner, the controller 204 may determine updated characteristics of the fog, for example, a second set of characteristics, which may include, for example, droplet sizes (or ranges of droplet sizes) or concentration.

The operation flow/algorithmic structure 300 may further include, at 320, providing the fog with a second set of characteristics. Providing the fog with the second set of characteristics may be done by the controller 204 controlling the flow devices 212 to provide a combined fluid flow to the nozzles 216 at a second rate or controlling an actuator.

Figure 4:
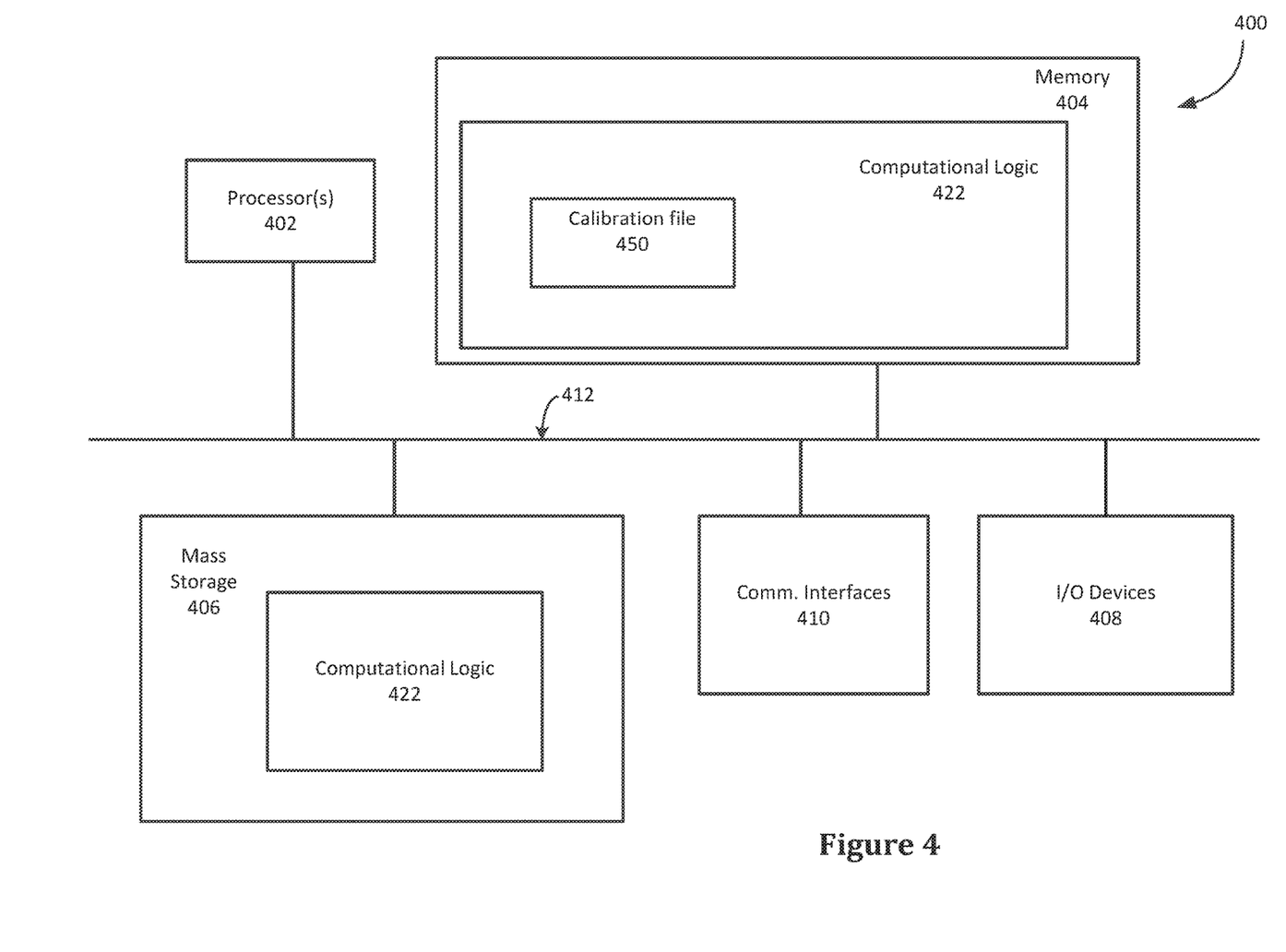

FIG. 4 illustrates an example computer device 400 suitable for use to practice aspects of the present disclosure, in accordance with various embodiments. In some embodiments, the computer device 400 may comprise, at least in part, a controller such as controller 172 or controller 204. As shown, computer device 400 may include one or more processors 402, and system memory 404. The processor 402 may include any type of processors. The processor 402 may be implemented as an integrated circuit having a single core or multi-cores, e.g., a multi-core microprocessor.

The computer device 400 may include mass storage devices 406 (such as diskette, hard drive, volatile memory (e.g., dynamic random access memory (DRAM)), compact disc read only memory (CD-ROM), digital versatile disk (DVD), flash memory, solid state memory, and so forth). In general, system memory 404 or mass storage devices 406 may be temporal or persistent storage of any type, including, but not limited to, volatile and non-volatile memory, optical, magnetic, or solid state mass storage, and so forth. Volatile memory may include, but is not limited to, static or dynamic random access memory. Non-volatile memory may include, but not be limited to, electrically erasable programmable read only memory, phase change memory, resistive memory, and so forth.

The computer device 400 may further include input/output (I/O) devices 408, which may include a user interface, for example, user interface 206, or an environmental sensor, for example environmental sensor 176 or environmental sensor 208. In some embodiments, the I/O devices 408 may include a microphone, sensors, display, keyboard, cursor control, remote control, gaming controller, image capture device, and so forth.

The communication interfaces 410 may include communication chips and associated components (receivers, transmitters, amplifiers, antenna, etc.) that may be configured to operate the device 400 in accordance with one or more networking protocols. The computer device 400 may use the communication interfaces 410 to communicate over one or more wired or wireless networks.

The above-described computer device 400 elements may be coupled to each other via a system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions to support the operations associated with spray system 100, for example, in support of operations associated with controller 172, or with fertilizer delivery system 200, for example, in support of operations associated with controller 204, generally shown as computational logic 422. Computational logic 422 may be implemented by assembler instructions supported by processor(s) 402 or high-level languages that may be compiled into such instructions. The permanent copy of the programming instructions may be placed into mass storage devices 406 in the factory, or in the field, through, for example, a distribution medium (not shown), such as a compact disc (CD), or through communication interfaces 410 (from a distribution server (not shown)). In some embodiments, aspects of computational logic 422 may be implemented in a hardware accelerator (e.g., Field Programmable Gate Arrays (FPGA)) integrated with, e.g., processor 402, to accompany the central processing units (CPU) of processor 402.

The computational logic 422 may include, or may otherwise have access to, calibration file 450. The calibration file 450, which may be similar to the calibration file described above with respect to FIGS. 1-3, may be a relational database that provides a mapping of environmental or target properties with fog characteristics. The computational logic 422 may access the calibration file 450 based on received signals to determine desired fog characteristics and may control flow-control devices accordingly as described herein.

Figure 5:
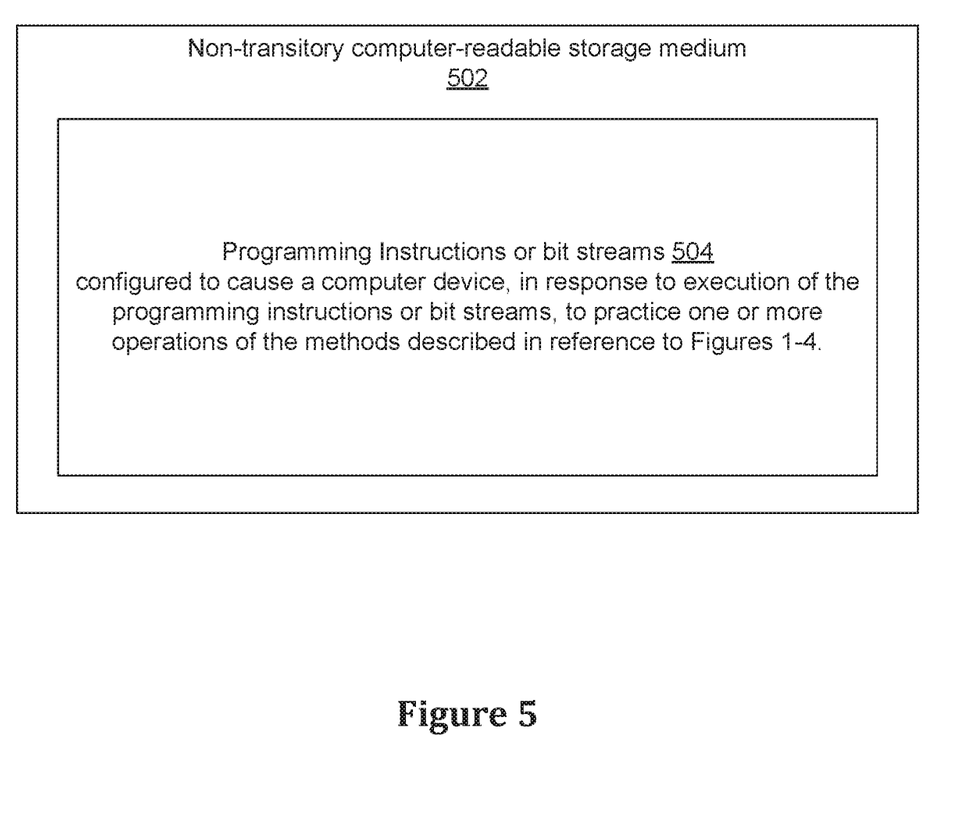

FIG. 5 illustrates an example non-transitory, computer-readable storage media 502 having instructions configured to practice all or selected ones of the operations associated with the processes described above. As illustrated, non-transitory computer-readable storage medium 502 may include a number of programming instructions 504 configured to implement computational logic 422, or bit streams 504 to configure the hardware accelerators to implement computational logic 422. Programming instructions 504 may be configured to enable a device, for example, controller 172 or controller 204, in response to execution of the programming instructions, to perform (or support performance of) one or more operations of the processes described in reference to FIGS. 1-4. In alternate embodiments, programming instructions/bit streams 504 may be disposed on multiple non-transitory computer-readable storage media 502 instead. In still other embodiments, programming instructions/bit streams 504 may be encoded in transitory computer-readable signals.

Referring again to FIG. 4, at least one of processors 402 may be packaged together with memory respectively having computational logic 422 (or a portion thereof) configured to support practice or practice aspects of embodiments described in reference to FIGS. 1-3. In some embodiments, at least one of the processors 402 (or a portion thereof) may be packaged together with memory having respectively computational logic 422 or aspects thereof configured to support the practice or practice aspects of disclosed operation flows/algorithmic structures to form a System in Package (SiP) or a System on Chip (SoC).

Although certain embodiments have been illustrated and described herein for purposes of description, a wide variety of alternate or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, or methods of various embodiments are provided below. An embodiment of the devices, systems, or methods may include any one or more, and any combination of, the examples described below.

Example 1 may include a system comprising: a compressed gas source to provide pressurized gas; and a nozzle having a body that includes: a first intake to receive the pressurized gas from the compressed gas source; and a second intake to receive liquid from a liquid reservoir, wherein the pressurized gas is to siphon the liquid from the liquid reservoir to provide a fluid flow through the nozzle; and a head, coupled with the body, that includes one or more foils, wherein the fluid flow through the nozzle is to cause the head to vibrate at a first frequency, the vibration of the head at the first frequency coupled with fluid flow over the one or more foils to produce a fog.

Example 2 may include the system of Example 1, further comprising: a controller to control the compressed gas source to provide the pressurized gas at a first pressure to provide the fog with a first range of droplet sizes and to provide the pressurized gas at a second pressure to provide the fog with a second range of droplet sizes.

Example 3 may include the system of Example 2, wherein the controller is to control the compressed gas source based on a calibration file that correlates properties of a target with sets of characteristics of the fog.

Example 4 may include the system of Example 2, wherein the first range of droplet sizes include droplet sizes less than one micron.

Example 5 may include the system of Example 4, wherein the first range of droplet sizes include droplet sizes of Example 05 microns.

Example 6 may include the system of Example 2, further comprising: an environmental sensor to sense a property of a target and to generate a feedback signal, wherein the controller is coupled with the environmental sensor to receive the feedback signal and to control the compressed gas source based on the feedback signal.

Example 7 may include the system of Example 6, wherein the environmental sensor comprises an image-detection device and the target is a plant.

Example 8 may include the system of Example 7, wherein the controller is to determine a change in the property of the plant over time and to control the compressed gas source based on the change.

Example 9 may include the system of Example 6, wherein the property is a size of the plant.

Example 10 may include a system comprising: a compressed gas source to provide pressurized gas; a nozzle having a body that includes: a first intake to receive the pressurized gas from the compressed gas source; and a second intake to receive a liquid fertilizer; wherein the pressurized gas and the liquid fertilizer combine to provide a fluid flow through the nozzle; and a head, coupled with the body, that includes one or more foils, wherein the fluid flow through the nozzle is to cause the head to vibrate, the vibration of the head coupled with fluid flow over the one or more foils to produce a fog having droplet sizes of less than one micron.

Example 11 may include the system of Example 10, further comprising: a controller to control the compressed gas source to provide the pressurized gas at a first pressure to provide the fog with a first range of droplet sizes and to provide the pressurized gas at a second pressure to provide the fog with a second range of droplet sizes.

Example 12 may include the system of Example 11, wherein the controller is to control the compressed gas source based on a calibration file that correlates properties of a target with sets of characteristics of the fog.

Example 13 may include the system of Example 11, further comprising: an environmental sensor to sense a property of a target and to generate a feedback signal, wherein the controller is coupled with the environmental sensor to receive the feedback signal and to control the compressed gas source based on the feedback signal.

Example 14 may include the system of Example 13, wherein the environmental sensor comprises an image-detection device and the target is a plant.

Example 15 may include a system comprising: a compressed gas source to provide pressurized gas; a nozzle having a body that includes: a first intake to receive the pressurized gas from the compressed gas source; and a second intake to receive a liquid fertilizer; wherein the pressurized gas and the liquid fertilizer combine to provide a fluid flow through the nozzle; and a head, coupled with the body, that includes one or more foils, wherein the fluid flow through the nozzle is to cause the head to vibrate, the vibration of the head coupled with fluid flow over the one or more foils to produce a fog; and a controller to control the compressed gas source to provide the pressurized gas at a first pressure to provide the fog with a first set of characteristics and to provide the pressurized gas at a second pressure to provide the fog with a second set of characteristics.

Example 16 may include the system of Example 15, wherein the controller is to determine a property of a plant and access a calibration file based on the property to identify the first or second set of characteristics.

Example 17 may include the system of Example 16, wherein the controller is to determine the property of the plant based on input signals received from a user interface or feedback signals from an environmental sensor.

Example 18 may include one or more non-transitory, computer-readable media having instructions that, when executed, cause a controller to: provide, based on a calibration file, a fog with a first set of characteristics, the first set of characteristics to include a first range of droplet sizes; detect an update event; and provide, based on the calibration file and the update event, the fog with a second set of characteristics, the second set of characteristics to include a second range of droplet sizes.

Example 19 may include the one or more non-transitory, computer-readable media of Example 18, wherein the update event is a change in a property of a plant.

Example 20 may include the one or more non-transitory, computer-readable media of Example 18, wherein the first or second range of droplet sizes include droplet sizes below one micron.

Example 21 may include a method comprising providing, based on a calibration file, a fog with a first set of characteristics, the first set of characteristics to include a first range of droplet sizes; detecting an update event; and providing, based on the calibration file and the update event, the fog with a second set of characteristics, the second set of characteristics to include a second range of droplet sizes.

Example 22 may include the method of Example 21, wherein the update event is a change in a property of a plant.

Example 23 may include the method of example 21 or 22, wherein the first or second range of droplet sizes include droplet sizes below one micron.

Example 24 may include an apparatus comprising logic, modules, or circuitry to perform one or more elements of a method described in or related to any of Examples 21-23, or any other method or process described herein.

Example 25 may include a method, technique, or process as described in or related to any of Examples 21-23, or portions or parts thereof.

Example 26 may include an apparatus comprising: one or more processors and one or more computer readable media comprising instructions that, when executed by the one or more processors, cause the one or more processors to perform the method, techniques, or process as described in or related to any of Examples 21-23, or portions thereof.

Although certain embodiments have been illustrated and described herein for purposes of description, a wide variety of alternate or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

I claim:

1. A system comprising:
a gas source to provide pressurized gas;
a nozzle having:
  a body that includes: a first intake to receive a pressurized gas; and a second intake to receive a solution that includes a chemical or biological solute, wherein the pressurized gas and the solution combine to provide a fluid flow through the nozzle; and
  a head, coupled with the body, that includes one or more foils to be substantially exposed to the fluid flow,
  wherein the fluid flow through the nozzle is to cause the head to vibrate, the vibration of the head coupled with fluid flow over the one or more foils to produce a fog having sub-micron droplets; and
one or more flow-control devices to provide the pressurized gas or the solution to the nozzle; and
a controller to control the one or more flow-control devices to provide the fog with a set of characteristics, wherein the controller is to control the one or more flow-control devices to provide the pressurized gas with a pressure that is based on a calibration file that correlates properties of a target, to which the system is to apply the fog, with sets of characteristics of the fog.

2. The system of claim 1, wherein the chemical or biological solute is a pesticide.

3. The system of claim 1, wherein the chemical or biological solute is a fertilizer.

4. The system of claim 1, further comprising: an environmental sensor to detect characteristics of the fog or a target to which the system is to apply the fog.

5. The system of claim 4, wherein the environmental sensor is to provide feedback signals based on detection of an interaction between the fog and the target, and the controller is to control the flow-control devices based on the feedback signals.

6. The system of claim 4, wherein the environmental sensor includes an image-detection device.

7. The system of claim 6, wherein the solution includes a traceable solution, the target is a plant, and the environmental sensor is to detect how the plant absorbs the traceable solution or how the traceable solution moves through the plant.

8. The system of claim 7, wherein the controller is to control the one or more flow-control devices based on how the plant absorbs the traceable solution or how the traceable solution moves through the plant.

9. The system of claim 1, wherein the chemical or biological solute is a pharmaceutical.

10. The system of claim 1, further comprising:

a user interface to generate input signals based on user input, wherein the controller is to control the one or more flow-control devices based on the input signals.

11. A system comprising:

a nozzle having:

a body that includes: a first intake to receive pressurized gas; and a second intake to receive a solution, wherein the pressurized gas and the solution combine to provide a fluid flow through the nozzle; and a head, coupled with the body, that includes one or more foils to be substantially exposed to the fluid flow, wherein the fluid flow through the nozzle is to cause the head to vibrate, the vibration of the head coupled with fluid flow over the one or more foils to produce a fog having droplet sizes of less than one micron; and one or more flow-control devices to provide the nozzle with the pressurized gas or the solute; and a controller to access a calibration file to determine a set of fog characteristics and to control the flow-control devices to provide the fog with the determined set of fog characteristics, wherein the calibration file correlates properties of a target, to which the system is to apply the fog, with a plurality of sets of fog characteristics.

12. The system of claim 11, wherein the chemical or biological solute is a pesticide, a fertilizer, or a pharmaceutical.

13. The system of claim 11, further comprising: an environmental sensor to detect characteristics of the fog or a target to which the system is to apply the fog.

14. The system of claim 13, wherein the environmental sensor is to provide feedback signals based on detection of an interaction between the fog and the target, and the controller is to control the flow-control devices based on the feedback signals.

15. The system of claim 13, wherein the environmental sensor includes an image-detection device.

16. The system of claim 15, wherein the solution includes a traceable solution, the target is a plant, and the environmental sensor is to detect how the plant absorbs the traceable solution or how the traceable solution moves through the plant and the controller is to control the one or more flow-control devices based on how the plant absorbs the traceable solution or how the traceable solution moves through the plant.

17. The system of claim 11, further comprising:

a user interface to generate input signals based on user input, wherein the controller is to control the one or more flow-control devices based on the input signals.

18. The system of claim 1, wherein the foils are connected to and protrude from a surface of the head.

19. A system comprising:

a gas source to provide pressurized gas;

a nozzle having:

a body that includes: a first intake to receive a pressurized gas; and a second intake to receive a solution that includes a chemical or biological solute, wherein the pressurized gas and the solution combine to provide a fluid flow through the nozzle, and wherein the solution includes a traceable solution; and     a head, coupled with the body, that includes one or more foils to be substantially exposed to the fluid flow,     wherein the fluid flow through the nozzle is to cause the head to vibrate, the vibration of the head coupled with fluid flow over the one or more foils to produce a fog having sub-micron droplets; and one or more flow-control devices to provide the pressurized gas or the solution to the nozzle;

an environmental sensor to detect how a plant absorbs the traceable solution or how the traceable solution moves through the plant and to provide one or more feedback signals indicative of the detection; and a controller to control the one or more flow-control devices, based on the one or more feedback signals, to provide the fog with a set of characteristics.

20. The system of claim 19, wherein the controller is to control the one or more flow-control devices based on a calibration file that correlates properties of a target, to which the system is to apply the fog, with sets of characteristics of the fog.

21. The system of claim 20, wherein the chemical or biological solute is a pesticide or a fertilizer.

22. The system of claim 21, wherein the environmental sensor is further to detect characteristics of the fog.

23. The system of claim 22, wherein the environmental sensor includes an image-detection device.

* * * * *